United States Patent [19]
Lau et al.

[11] Patent Number: 6,118,073
[45] Date of Patent: *Sep. 12, 2000

[54] FRAME ASSEMBLY FOR ELECTRICAL ENCLOSURE

[75] Inventors: Robert G. Lau, Anoka, Minn.; Rieger Uwe, Baden-Württemberg, Germany; Klaus Kern; Henning Wick, both of Straubenhardt, Germany

[73] Assignee: Hoffman Enclosures, Inc., Anoka, Minn.

[*] Notice: This patent issued on a continued prosecution application filed under 37 CFR 1.53(d), and is subject to the twenty year patent term provisions of 35 U.S.C. 154(a)(2).

[21] Appl. No.: 08/609,889

[22] Filed: Mar. 1, 1996

[51] Int. Cl.⁷ ...................................................... H05K 5/03
[52] U.S. Cl. .......................... 174/66; 312/321.5; 403/282; 403/403; 211/103; 211/182; 52/656.9; 52/801.12; 49/70; 411/399; 411/999
[58] Field of Search ..................... 174/66, 50; 312/321.5, 312/264, 265, 265.5, 265.6, 223.1; 403/403, 282, 231; 220/3.8, 241; 211/182, 87, 103, 26; 52/656.9, 801.11, 801.12; 49/70; 411/399, 968, 969, 999

[56] References Cited

U.S. PATENT DOCUMENTS

| | | | |
|---|---|---|---|
| 789,107 | 5/1905 | Steele | 411/399 X |
| 2,880,021 | 3/1959 | White | 403/282 X |
| 3,131,512 | 5/1964 | MacLead, Jr. | 220/3.8 X |
| 3,828,422 | 8/1974 | Schmitt | 411/399 X |
| 3,877,138 | 4/1975 | Suchowski | 52/656.9 X |
| 3,896,867 | 7/1975 | Gill et al. | 411/999 X |
| 4,589,792 | 5/1986 | Niziol | 403/403 X |
| 4,683,634 | 8/1987 | Cole | 52/656.9 X |
| 4,988,230 | 1/1991 | Banthia et al. | 52/656.9 X |
| 5,036,488 | 7/1991 | Motarjemi | 174/50 X |
| 5,439,282 | 8/1995 | Probst et al. | 312/231.5 |

FOREIGN PATENT DOCUMENTS

| | | |
|---|---|---|
| 0 583 856 A1 | 2/1994 | European Pat. Off. . |
| 40 04 838 C1 | 2/1991 | Germany . |
| 40 13 381 C1 | 7/1991 | Germany . |
| 41 03 785 C2 | 11/1992 | Germany . |
| 295 16 362 U1 | 2/1996 | Germany . |
| 1120620 | 7/1968 | United Kingdom ................. 174/50 X |

OTHER PUBLICATIONS

Hoffman Engineering Company Specifier's Guide, 1995–1996, pp. 10–18, showing frames, 1995.

*Primary Examiner*—Dean A. Reichard
*Attorney, Agent, or Firm*—Merchant & Gould P.C.

[57] ABSTRACT

An electrical enclosure having a housing including a door. The electrical enclosure includes a frame assembly and a plurality of fasteners. The frame assembly has a first side including a planar portion opposite the door. The plurality of fasteners are disposed through the frame assembly for mounting the frame assembly to the door such that the fasteners do not protrude beyond the plane of the planar portion.

23 Claims, 6 Drawing Sheets

FRAME ASSEMBLY FOR ELECTRICAL ENCLOSURE

FIELD OF THE INVENTION

The present invention relates generally to door frame assemblies, and more particularly, to frame assemblies for supporting doors of electrical enclosures.

BACKGROUND OF THE INVENTION

Electrical enclosures typically include an outer housing and a door and are manufactured of a plastic or a metal, such as steel. The outer housing and door form an enclosure which houses electrical components, such as switches. The door is typically made of sheet metal having sufficient strength to avoid unwanted contamination of the electrical components by dust or water. These doors lack rigidity, and, especially with larger doors, may be perceived to be flimsy and thus cheap by some customers. Moreover, it has become desirable to mount electrical accessories to the inner side of the door. Sheet metal doors generally lack the rigidity and mounting surface necessary to durably and easily accommodate such accessories.

To increase the rigidity of electrical enclosure doors and to facilitate mounting of accessories, door-support frame assemblies, such as the assembly disclosed in German Patent No. 41 03 785 C2 to Reuter, have been used. These frame assemblies typically include a pair of vertical tubular members, a pair of horizontal tubular members and four corner fasteners, which interconnect the vertical tubes with the horizontal tubes to form a generally rectangular frame assembly. The frame assembly is mounted to the inner side of the door using a number of threaded nut and bolt assemblies. To facilitate the mounting of accessories, the frame assembly is provided with bore holes along its tubes for mounting accessories on the frame assembly Typically, a number of threaded bolts are mounted to the inner side of the door and are received by holes in the frame assembly. The holes also receive internally threaded nuts, which are provided with guide sleeves onto which a washer is placed. The guide sleeves then receive the threaded bolts so that the nuts can be screwed to the bolts to mount the frame assembly to the door. Typically, a threaded nut and bolt assembly is used in each corner of the frame assembly and in the middle of the vertical tubes if the cabinet is tall. However, in these frame assemblies, the threaded nuts protrude from an outer plane of the frame assembly. The protruding nuts limit the ability to mount accessories and also catch on objects, such as a user's clothes.

Consequently, there is a need in the electrical enclosure industry for a door-support frame assembly which increases the rigidity of the door and provides an unobstructed surface for mounting accessories. The present invention addresses this and other needs associated with frame assemblies.

SUMMARY OF THE INVENTION

The present invention is directed to an electrical enclosure having a housing including a door. The electrical enclosure includes a frame assembly and a plurality of fasteners. The frame assembly has a first side including a planar portion opposite the door. The plurality of fasteners are disposed through the frame assembly for mounting the frame assembly to the door such that the fasteners do not protrude beyond the plane of the planar portion.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter in which there are illustrated and described embodiments of the invention.

DETAILED DESCRIPTION OF THE EMBODIMENTS

Figure 1:
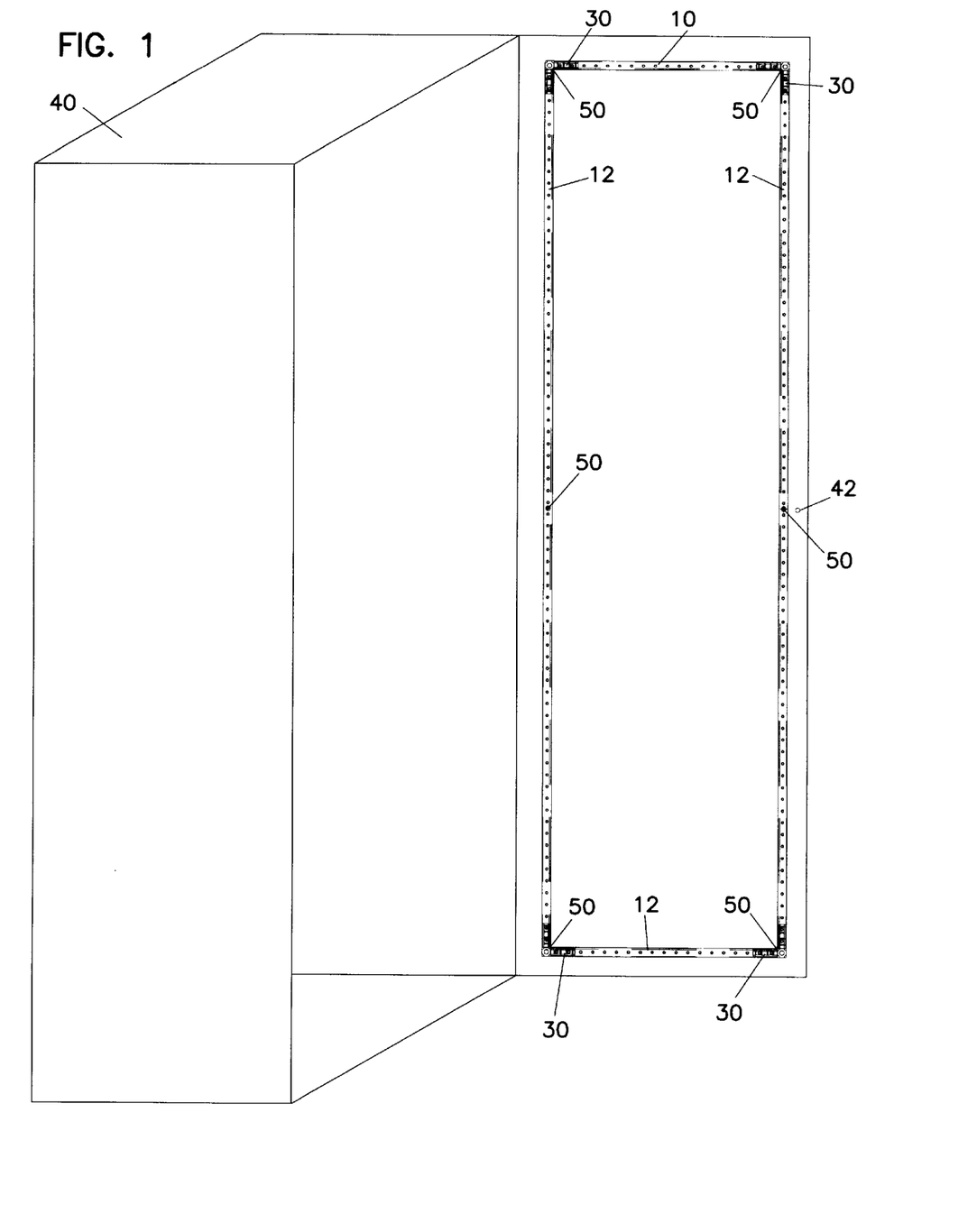
FIG. 1 shows a perspective view of an electrical enclosure having a frame assembly in accordance with the principles of the present invention.

Referring now to the drawings, and more particularly to FIG. 1, an exemplary frame assembly 10 mounted to a door 42 of an electrical enclosure 40 is shown. Frame assembly 10 includes four corner members 30, four tubular members or tubes 12, a pair of which are vertical and a pair of which are horizontal, and a plurality of fasteners 50. Each corner member 30 interconnects a vertical tube 12 with a horizontal tube 12 to form a typically rectangular frame assembly 10 as shown. Frame assembly 10 includes a first side opposite door 42 and a second side facing door 42, the first side having a substantially planar surface.

Tubes 12 may be constructed of plastic or metal, and in the exemplary embodiment, comprise preplated, rolled 20 gauge steel. Corner members 30 may be constructed of plastic or metal, and, in the exemplary embodiment, are comprised of zinc. Metal tubes and corner members enhance the ability to ground frame assembly 10 and thus simplify mounting of electrical accessories.

Figure 2:
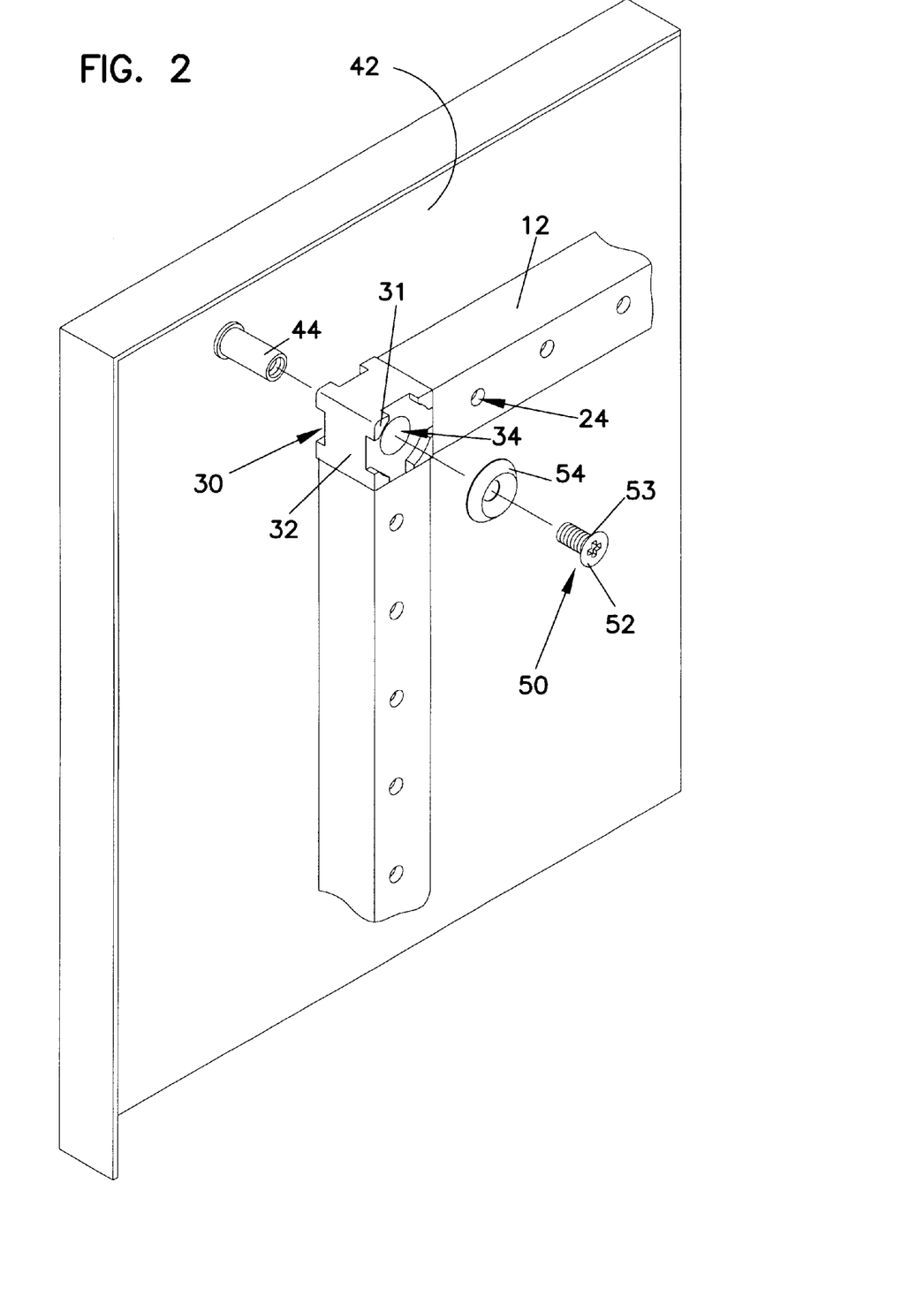
FIG. 2 shows a perspective view of a corner of the frame assembly shown in FIG. 1, illustrating how it mounts to a door.
Figure 3:
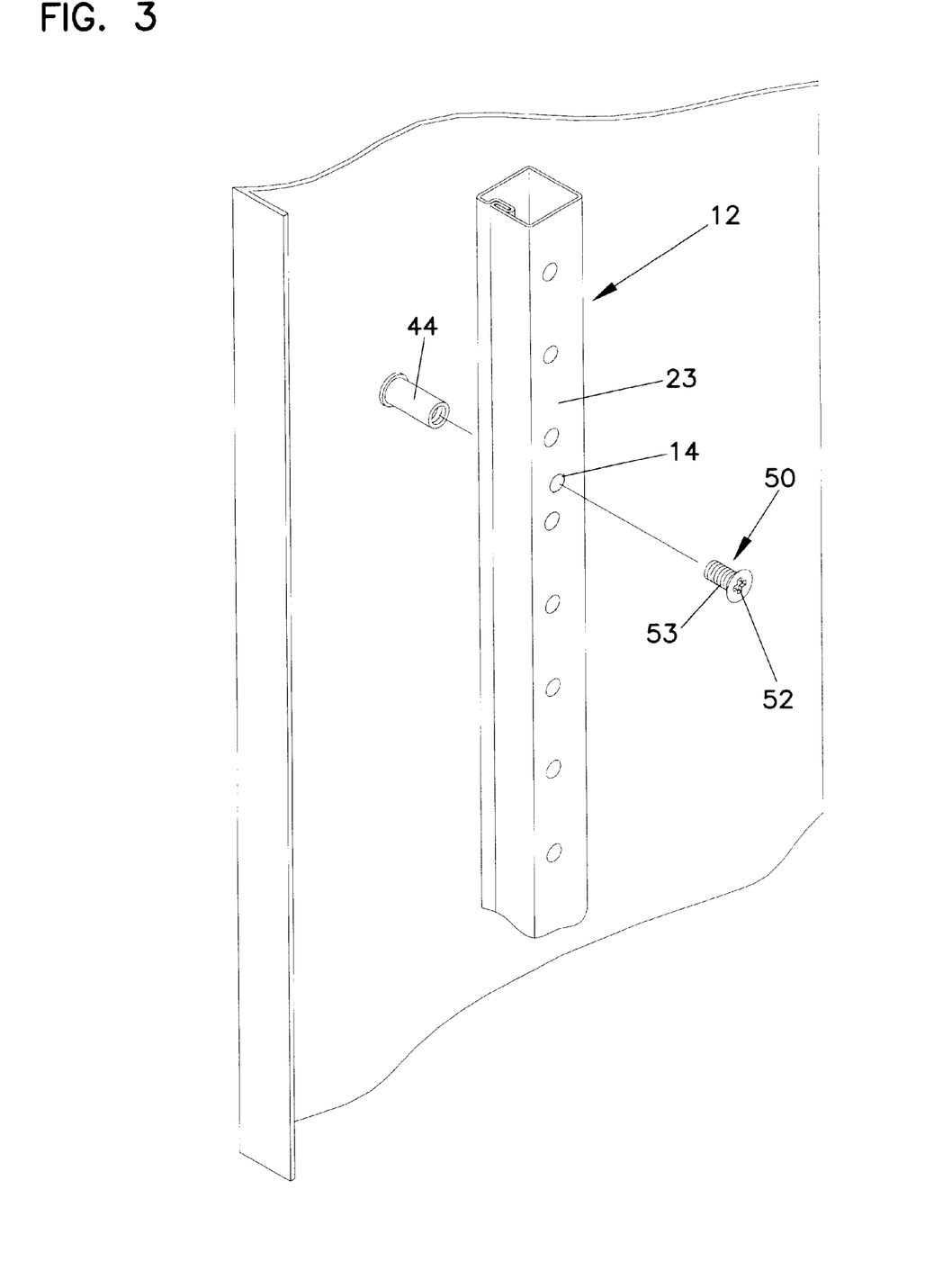
FIG. 3 shows a detailed perspective view of a section of the tube for the frame assembly shown in FIG. 1, illustrating how the tube mounts to a door.

Frame assembly 10 may be mounted to door 42 using studs 44 and fasteners 50 as shown in FIGS. 2 and 3. Fasteners 50 may comprise threaded, flathead screws each having a head 52 with a tapered edge 53. Studs 44 are typically welded to door 42 and may be cylindrically shaped and internally threaded for threadably receiving fasteners 50. It is noted, however, that in alternate embodiments, studs 44 may be externally threaded bolts and fasteners 50 may be internally threaded nuts accompanied with cylindrical sheaths.

In the exemplary embodiment, one stud 44 is provided in each corner of door 42 for mounting frame assembly 10 through its corner members 30, and one stud 44 is provided with each vertical tube 12 for mounting vertical tubes 12 to door 42. Studs 44 are typically positioned such that frame assembly 10 lies a given distance from the edge of door 42, so that sufficient room is provided for mounting hinges and a lock. It is noted that with smaller enclosures, mounting of vertical tubes 12 is not necessary, and frame assembly 10 may be sufficiently mounted to door 42 by mounting through corner members 30 only.

Figure 4:
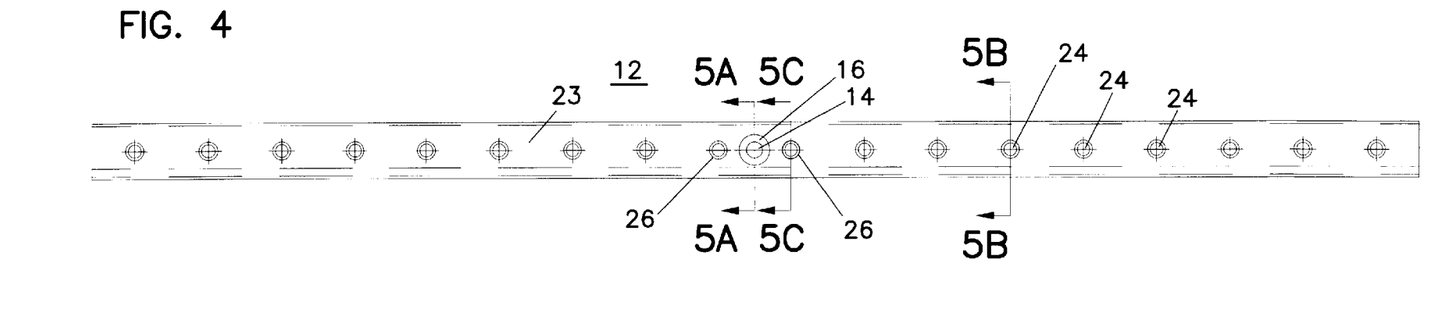
FIG. 4 shows a side elevational view of a section of a tube shown in FIG. 1.
Figure 5A:
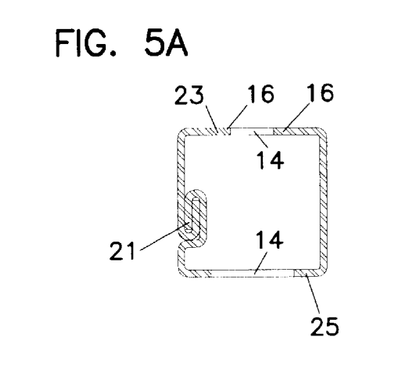
FIG. 5A shows a cross-sectional view taken along line 5A—5A of FIG. 4.
Figure 5B:
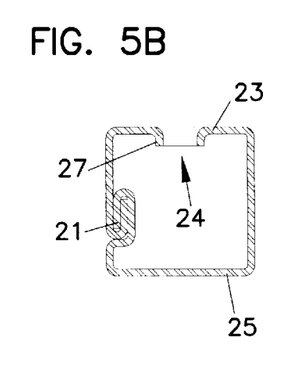
FIG. 5B shows a cross-sectional view taken along line 5B—5B of FIG. 4.
Figure 5C:
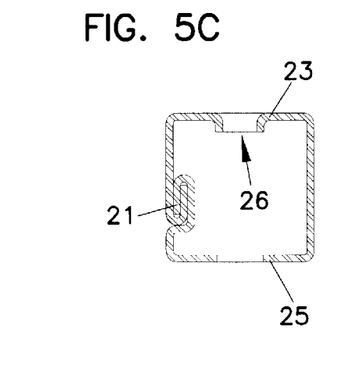
FIG. 5C shows a cross-sectional view taken along line 5C—5C of FIG. 4.
Figure 5D:
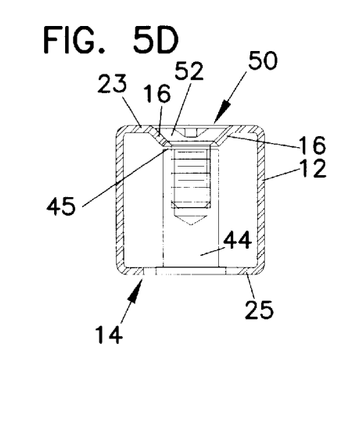
FIG. 5D shows a cross-sectional view of an opening of FIG. 5A having a fastener and stud mounted therein.

Turning now to FIGS. 4 and 5A–D, there is shown an exemplary tube 12. In the exemplary embodiment, vertical and horizontal tubes 12 are manufactured by rolling and thus include a rolled portion 21. Tubes 12 further include a first side 23 opposite door 42 and a second side 25 facing door 42. Each vertical tube 12 may be provided with an opening 14 passing through first side 23 and second side 25 for receiving a fastener 50 and a stud 44. Fastener 50 passes through first side 23 and stud 44 passes through second side 25 and receives fastener 50 in order to mount vertical tubes 12 to door 42 as best shown in FIGS. 3 and 5D. As shown in FIG. 5A, opening 14 may have a smaller diameter on the first side 23 than on the second side 25, since, in the exemplary embodiment, the second side 25 of opening 14 receives a stud 44 having a diameter larger than that of the fastener 50 which is received by the first side 23.

In the exemplary embodiment, openings 14 are disposed at the midpoint of vertical tubes 12. However, opening 14 can be disposed in other places along vertical tubes 12, or, more than one opening 14 may be provided in each vertical tube 12, if so desired. Moreover, though typically not required, one or more openings 14 may be provided in horizontal tubes 12. It is noted that in the exemplary embodiment, horizontal tubes 12 are similar to vertical tubes 12, save that horizontal tubes 12 are generally not mounted to door 42 and thus are not provided with openings 14. It should be appreciated that first side 23 of tubes 12 has a substantially planar surface with the exception of holes, i.e., the surface of first side 23 is substantially flat.

As best shown in FIGS. 5A and 5D, vertical tubes 12 may be provided with a countersunk region 16 surrounding openings 14. As shown in FIG. 5A, countersunk region 16 may be initially coplanar with the plane of the planar portion of vertical tube 12 and, as shown in FIG. 5D, when frame assembly 10 is mounted to door 42, countersunk region 16 yields so as to be depressed relative to the plane of the planar portion such that fasteners 50 do not protrude beyond the plane of the planar portion. In this manner, countersunk region 16 allows fastener 50 to be self-countersinking.

With reference to FIG. 5D, it can be seen that countersunk region 16 cooperates with an upper end 45 of stud 44 to limit the depth to which fastener 50 is received by stud 44. Prior to tightening of fasteners 50, upper end 45 is initially spaced a distance from the first side 23 of tube 12. As shown in FIG. 5D, when frame assembly 10 is mounted to door 42, countersunk region 16 yields until it abuts upper end 45. The initial spacing between first side 23 of tube 12 and upper end 45 of stud 44 may be provided such that the depth to which fastener 50 is received is limited so that when frame assembly 10 is mounted to door 42, fastener 50 lies flush with the plane of the planar portion of the tube 12. It should further be appreciated that tapered edges 53 of fastener 50 cooperate with countersunk region 16 to provide a substantially continuous planar surface formed by tubes 12 and fastener heads 52.

Tubes 12 may further be provided with holes 24, as shown in FIGS. 4 and 5B, for mounting accessories to the inner side of door 42. Holes 24 need only be provided through first side 23, and may be spaced equidistant along the length of tube 12. It should be apparent that an edge of first side 23 of tubes 12 forms the perimeter of each hole 24. In the exemplary embodiment, the edge may extend inwardly to form a lip 27 for providing additional strength with which to hold mounted accessories. An additional two holes 26 extending through both first side 23 and second side 25 may be provided to allow an external mechanism (not shown) to grip and position tubes 12 for crimping or otherwise connecting them to corner members 30.

Figure 6:
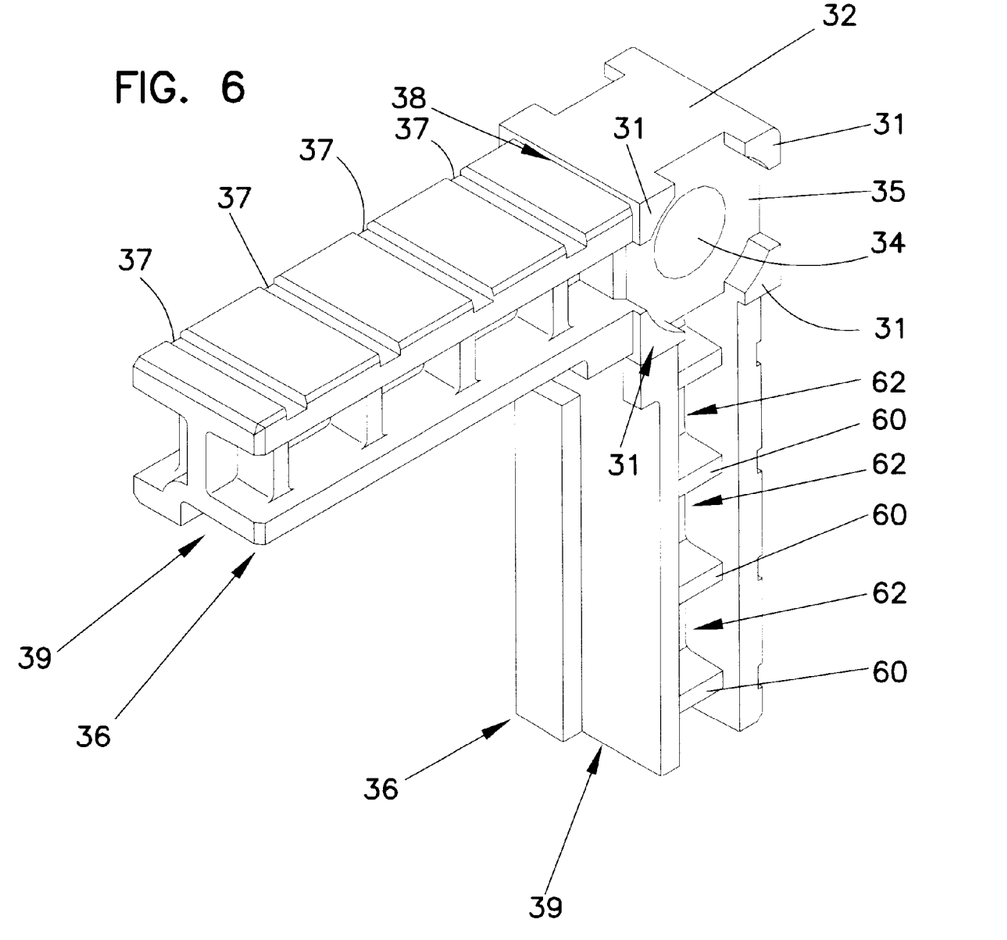
FIG. 6 shows a perspective view of a corner member of FIG. 1.
Figure 7:
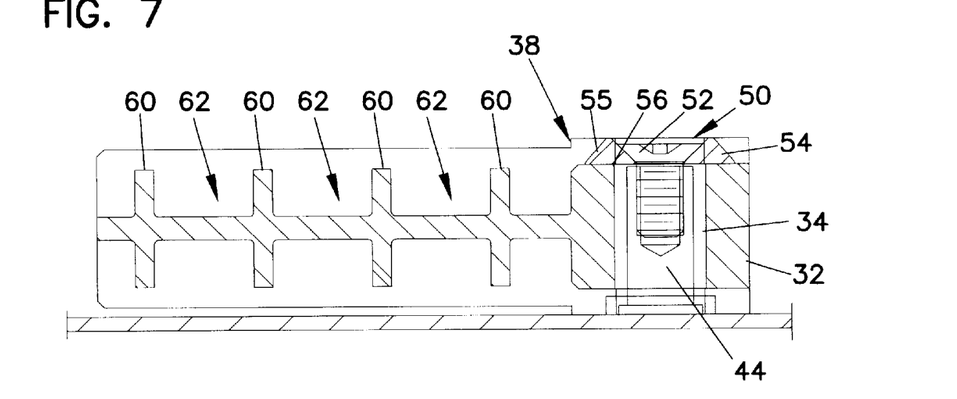
FIG. 7 shows a cross-sectional view of the corner member of FIG. 6 fastened to a door; and, FIG. 8 shows an elevational view of the corner member of FIG. 6.
Figure 8:
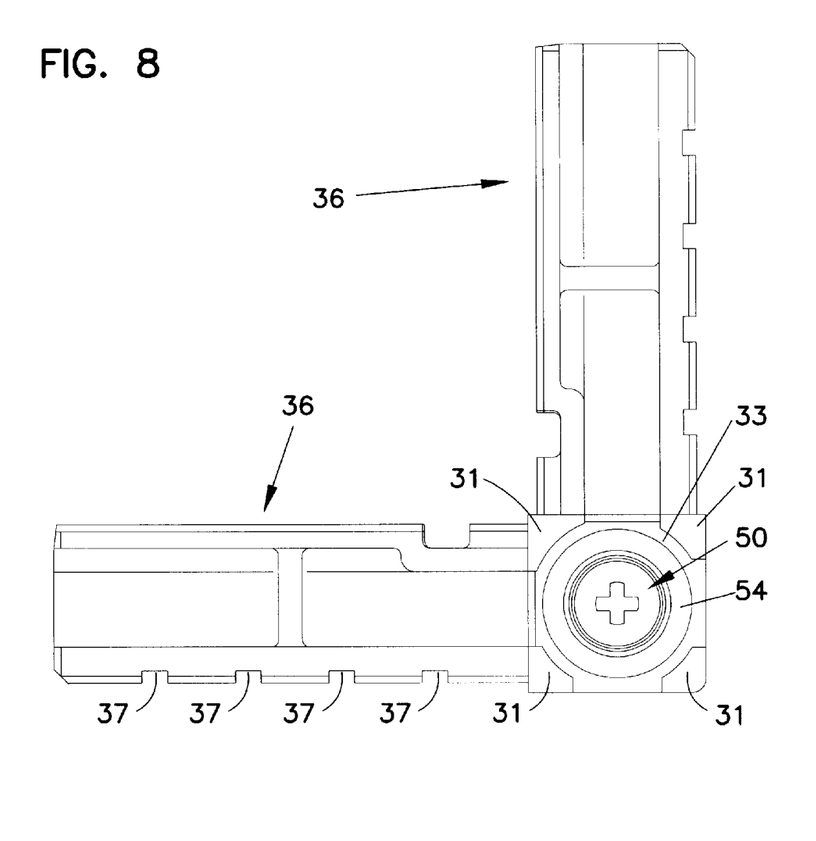

Referring now to FIGS. 6, 7 and 8, there is illustrated an exemplary one of corner members 30. To facilitate mounting and assembly, exemplary corner members 30 are interchangeable. Each corner member 30 includes a mounting portion 32 and a pair of legs 36 extending from mounting portion 32. Mounting portion 32 may include raised portions 31 and a recess 35, the purpose of which will become apparent hereinafter. Legs 36 are each received by a corresponding vertical or horizontal tube 12. Though corner members 30 having a pair of legs are exemplified herein, it is noted that mounting portion 32 may be provided with more than two legs 36 for interconnecting more than two tubes 21, e.g., where a lattice framework is desired.

The cross-section of each leg 36 is stepped down from the mounting portion 32 to form a lip 38 for limiting the depth to which a leg 36 is received by a tube 12. Moreover, in the exemplary embodiment, the depth of lip 38 is sized to the thickness of tubes 12 such that tubes 12 lie flush with raised portions 31 of corner members 30. Thus, the upper surface of raised portions 31 lies in the same plane as that formed by first side 23 of tubes 12.

For securely connecting legs 36 and tubes 12, each leg 36 is provided with indentations 37 on one of its sides, for example, an outwardly facing side as shown. After a tube 12 receives a leg 36, it can be crimped into the indentations 37 for securing a connection therebetween. It is noted that crimping is only exemplary, and that, in alternate embodiments, the tubes and corner members may be connected by press-fitting, bolting, etc. Moreover, frame assembly 10 may be crimped or otherwise connected together prior to or after mounting to door 42.

As shown in the perspective view of FIG. 6, each leg 36 may include a recess 39 for receiving rolled portion 21 of tubes 12. Each leg 36 may further include grooves 62 separated by supports 60. Grooves 62 and supports 60 are desirable for decreasing the weight of frame assembly 10 and increasing its strength-to-weight ratio, and in addition, for facilitating the boring of holes 24 through a corner member 30, if so desired.

Mounting portion 32 of each corner member 30 defines a bore 34 provided to receive a stud 44 and a fastener 50 for mounting frame assembly 10 to door 42. Bore 34 may be circular and may have a diameter larger than the diameter of stud 44 such that there is play in bore 34, i.e., stud 44 and fastener 50 may move within bore 34, to account for mechanical tolerances in the construction, assembly, and mounting of frame assembly 10 to door 42. Though bore 34 may take any number of shapes, in the exemplary embodiment, bore 34 is circular, As indicated above, mounting portion 32 may also be provided with recess 35 for receiving head 52 of a fastener 50 so that head 52 does not protrude from the plane of frame assembly 10. Moreover, recess 35 may be provided with a depth which limits the distance to which fastener head 52 is received so that a fastener head 52 lies flush with the plane of frame assembly 10. Fastener 50 may additionally be provided with a washer 54. As best shown in FIGS. 7 and 8, washer 54 may be circular and have an outer perimeter 55 with a triangular cross-sectional area. It should be appreciated that the inner surface 56 of outer perimeter 55 of washer 54 may be provided with a taper which mates with the tapered edge 53 of fastener head 52. As shown in FIG. 8, recess 35 may be sized larger than fastener 50 such that a gap 33 exists between raised portions 31 and washer 54 and/or fastener head 52 to allow movement of fastener 50 within recess 35. Gap 33 also provides play in corner members 30 to account for mechanical tolerances.

An exemplary method for assembling and mounting the frame assembly includes first sliding the ends of each tube 12 over a respective corner member leg 36 and then crimping each tube 12 and corresponding leg 36 together. Following this, frame assembly 10 is positioned on the inner side of door 42 such that studs 44 are each received by a corresponding opening 14 or bore 34. Next, vertical tubes 12 are fastened to door 42, then corner members 30 are fastened to door 42. It is noted that with the selfcountersunk, countersunk fasteners 50, regions 16, vertical tubes, once fastened, are fixed. Consequently, the play provided by bores 34 and gaps 33 is desirable. This assembly and mounting method is exemplary only and many other methods may be used. For example, corner members 30 and legs 36 may be connected after frame assembly 10 is positioned on door 42 or after vertical tubes are fastened to door 42.

It will, of course, be understood that various modifications and additions can be made to the embodiment discussed herein above without departing from the scope or spirit of the present invention. For example, frame assembly may be employed in any type of enclosure having a door, for example, lockers, tool cabinets, etc. Accordingly, the scope of the present invention should not be limited to the particular embodiments discussed above, but should be defined only by the full and fair scope of the claims set forth below.

What is claimed is:

1. An electrical enclosure having a housing including a door, comprising:
   a frame assembly having a first side including a planar portion opposite the door, the frame assembly including a plurality of corner members each having two legs and a central mounting portion disposed between the two les; and
   a plurality of fasteners including corner fasteners, one of the corner fasteners disposed through a corresponding one of the central mounting portions for mounting the frame assembly to the door such that the corner fasteners do not protrude beyond the planar portion.

2. An electrical enclosure according to claim 1, wherein: the door includes studs; and
   the frame assembly includes a first set of tubes, each said tube having defining an opening therethrough, each said opening capable of receiving a corresponding one of the studs such that each said tube is connectable to the corresponding stud by one of the fasteners.

3. An electrical enclosure according to claim 2, wherein the frame assembly includes:
   a second set of tubes, wherein each said corner member interconnects one tube of the first set of tubes with one tube of the second set of tubes, each said corner member further defining a bore formed through the central mounting portion, the bore configured for receiving a corresponding one of the studs such that each said corner member may be connected to the corresponding stud by one of the corner fasteners.

4. An electrical enclosure according to claim 1, wherein the frame assembly is configured to be electrically grounded to the door.

5. The electrical enclosure of claim 1, wherein:
   each said corner fastener includes a head; and
   each said central mounting portion includes a recess for receiving the head of a corresponding corner fastener, each said recess having a perimeter spaced from a perimeter of the corresponding fastener.

6. The electrical enclosure according to claim 5, wherein each said corner fastener further includes a washer mating with a surface of the corner fastener head, the washer defining the perimeter of the corner fastener spaced from the perimeter of the corresponding recess.

7. The electrical enclosure of claim 1, wherein:
   the frame assembly includes a tube having a first side including a planar portion opposite the door; and
   the fasteners include a tube fastener disposed through the tube for mounting the frame assembly to the door, the tube being configured such that when the frame assembly is mounted, the tube fastener does not protrude beyond the planar portion.

8. An electrical enclosure according to claim 7, wherein the tube includes a first side, the first side having an opening and a countersunk region surrounding the opening, the opening receiving the tube fastener; and wherein the countersunk region is initially coplanar with the planar portion of the tube and, when the frame assembly is mounted to the door, the countersunk region is depressed relative to the planar portion such that the fastener does not protrude beyond the planar portion.

9. An electrical enclosure according to claim 8, wherein:
   the door includes a stud; and
   the tube has a second side facing the door, the second side defining an opening sized for receiving the stud, the second side opening being substantially aligned with the first side opening, such that the tube fastener is receivable by the stud for mounting the frame assembly to the door.

10. An electrical enclosure according to claim 9, wherein an upper end of the stud is initially spaced a distance from the first side of the tube, and wherein, when the frame assembly is mounted to the door, the upper end of the stud contacts the countersunk region and limits a depth to which the tube fastener is received by the stud.

11. An electrical enclosure according to claim 10, wherein a depth to which the tube fastener is received is limited by the upper end of the stud such that when the frame assembly is mounted to the door, the tube fastener lies flush with the planar portion of the tube.

12. An electrical enclosure according to claim 8, wherein the tube fastener includes a flat head with tapered edges, the tapered edges cooperating with the countersunk region to mount the frame assembly such that the tube fastener does not protrude beyond the planar portion of the tube.

13. An electrical enclosure according to claim 8, wherein the first side of the tube defines holes for mounting accessories.

14. An electrical enclosure according to claim 13, wherein a perimeter of at least one of the holes is defined by an edge of the first side of the tube, the edge extending inwardly to form a lip.

15. An electrical enclosure having a housing including a door, comprising:
   a frame assembly having a first side including a planar portion opposite the door; and a plurality of fasteners disposed through the frame assembly for mounting the frame assembly to the door such that the fasteners do not protrude beyond the planar portion wherein:

the door includes studs;

the frame assembly includes:

a first set of tubes, each said tube of the first set including a first side defining said planar portion opposite the door and a second side facing the door, each said tube defining an opening through the first and second side, the first side further defining a countersunk region surrounding the opening, the opening receiving a corresponding one of the fasteners and a corresponding one of the studs for mounting the frame assembly to the door, and wherein the countersunk region is initially coplanar with the planar portion of the tube and, when the frame assembly is mounted to the door, the countersunk region is depressed relative to the planar portion such that the fasteners do not protrude beyond the planar portion;

a second set of tubes; and a plurality of corner members, each corner member having:

a mounting portion defining a bore for receiving a corresponding one of the fasteners and a corresponding one of the studs such that the stud receives the fastener, wherein the bore is sized to allow movement of the corresponding one of the studs therein; and a pair of legs extending from the mounting portion for interconnecting one tube of the first set of tubes with one tube of the second set of tubes.

16. An electrical enclosure having a housing including a door, having a stud, comprising:

a frame assembly having a first side including a planar portion opposite the door, the frame assembly including a corner member, wherein the corner member includes two legs and a central mounting portion disposed between the two legs, the central mounting portion defining a bore for receiving the stud, wherein the bore is sized to allow movement of the stud therein; and a fastener including a head, the fastener disposed through the corner member for mounting the frame assembly to the door, the mounting portion of the corner member including a recess configured to receive the head such that when the frame assembly is mounted, the fastener does not protrude beyond the planar portion, and the stud receives the fastener.

17. An electrical enclosure according to claim 16, wherein bore and stud are circular, the bore having a diameter greater than the diameter of the stud.

18. An electrical enclosure according to claim 16, wherein the bore is sized to allow movement of the fastener therein.

19. An electrical enclosure according to claim 18, wherein the fastener further includes a circular washer having a tapered inner surface mating with a surface of the fastener head.

20. An electrical enclosure according to claim 16, wherein the frame assembly includes two tubes interconnected by the two legs.

21. An electrical enclosure according to claim 20, wherein the legs are connected to the tubes by crimping.

22. A frame assembly for mounting to a base, comprising:

a frame including a planar portion opposite the base; and a plurality of fasteners disposed through the frame and mounted to the base such that the fasteners do not protrude beyond the planar portion;

wherein the frame includes at least one corner member, each said corner member including two legs and a central mounting portion disposed between the two legs, the central mounting portion defining a bore for receiving a corresponding one of said fasteners, the central mounting portion including a recess configured to receive the corresponding one of said fasteners such that the corresponding one of said fasteners does not protrude beyond the planar portion.

23. A frame assembly according to claim 22, wherein the frame includes at least one tube, each said tube having a first side defining said planar portion opposite the base, the first side defining an opening and a countersunk region surrounding the opening, the opening receiving a corresponding one of said fasteners; and wherein the countersunk region is initially coplanar with the planar portion of the frame and, when the frame assembly is mounted to the base, the countersunk region is depressed relative to the planar portion such that the fastener does not protrude beyond the planar portion.

* * * * *